(No Model.)  2 Sheets—Sheet 1.
W. JOHNSTONE.
HANSOM CAB.
No. 331,504. Patented Dec. 1, 1885.
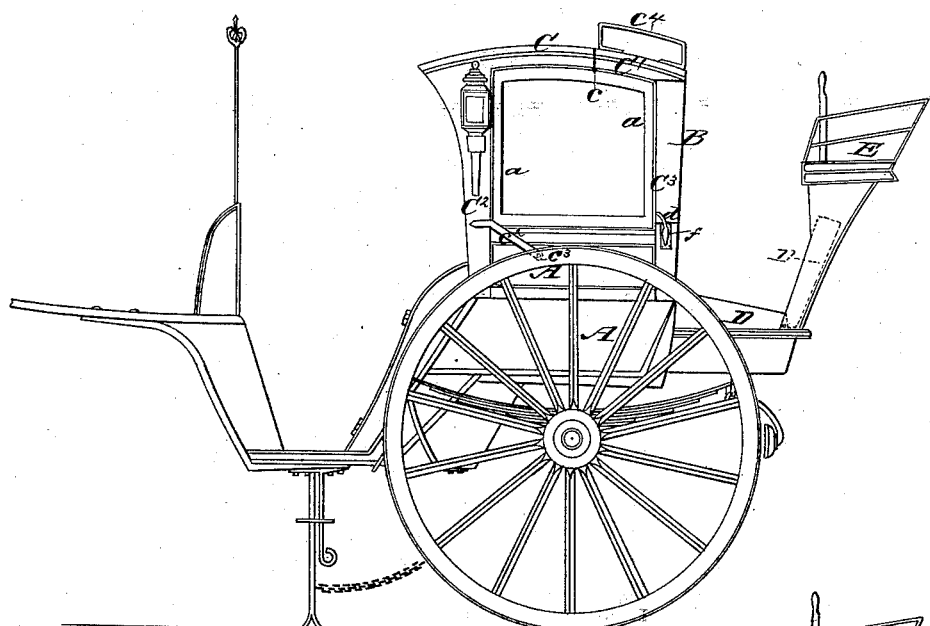
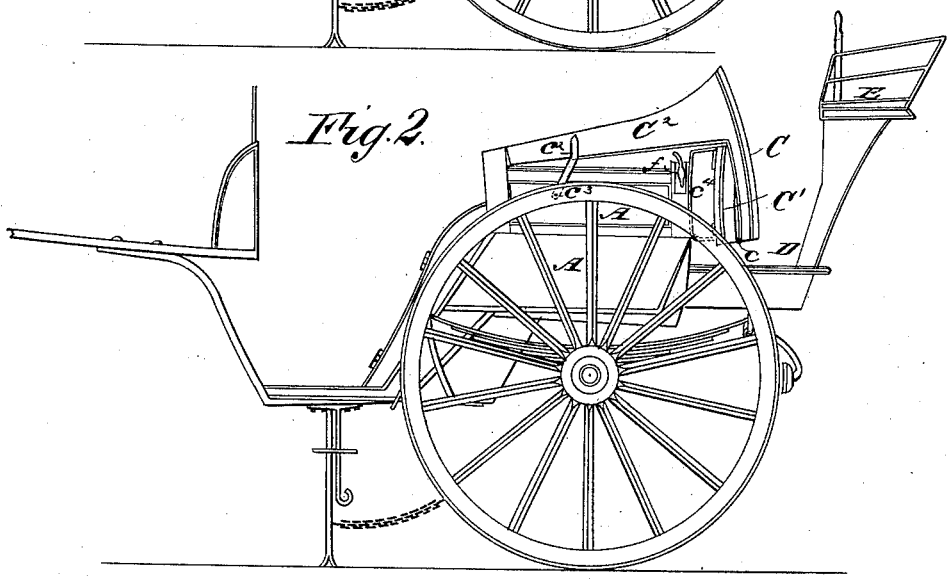
WITNESSES:
H. McArdle,
C. Sedgwick
INVENTOR:
W. Johnstone
BY Munn & Co.
ATTORNEYS.

(No Model.) 2 Sheets—Sheet 2.

W. JOHNSTONE.
HANSOM CAB.

No. 331,504. Patented Dec. 1, 1885.

WITNESSES:
F. M. Ardle
C. Sedgwick

INVENTOR:
W. Johnstone
BY Munn & Co
ATTORNEYS.

UNITED STATES PATENT OFFICE.

WILLIAM JOHNSTONE, OF EDINBURGH, COUNTY OF EDINBURGH, SCOTLAND, ASSIGNOR TO GEORGE C. BANKS, OF SAME PLACE.

HANSOM CAB.

SPECIFICATION forming part of Letters Patent No. 331,504, dated December 1, 1885.

Application filed September 16, 1885. Serial No. 177,295. (No model.) Patented in England January 26, 1881, No. 342; in India January 25, 1882, No. 102, and in France May 15, 1882, No. 147,740.

*To all whom it may concern:*

Be it known that I, WILLIAM JOHNSTONE, of Edinburgh, Edinburgh county, Scotland, have invented new and useful Improvements in Hansom Cabs, of which the following is a full, clear, and exact description.

My invention relates to certain improvements in Hansom cabs; and it consists in so constructing said cabs that the side and back panels or frames may be lowered, or the roof or top and side framing of such a vehicle can be folded down to form an open carriage or species of phaeton for use in fine weather, or be fixed up in the form of an ordinary Hansom cab when desired.

Reference is to be had to the accompanying drawings, forming a part of this specification, in which similar letters of reference indicate corresponding parts in all the figures.

Figure 3:
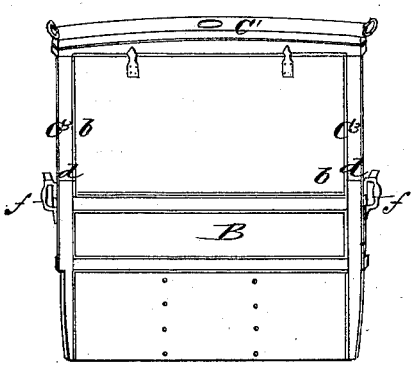
Figure 4:
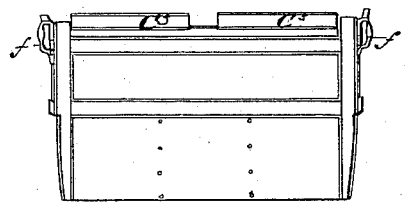
Figure 5:
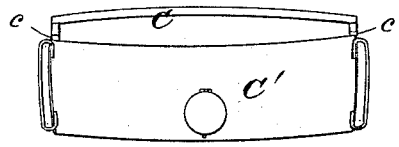
Figures 6, 7:
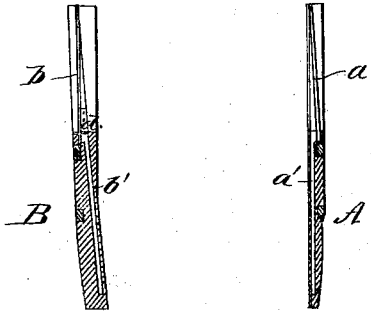

Figure 1 is a side elevation of my improved vehicle fitted up as a Hansom cab. Fig. 2 is a view of the same vehicle with the top or roof and back and side frames folded down to form an open carriage or phaeton. Fig. 3 is a rear view of the back of the body of the vehicle when the parts are in the position shown in Fig. 1. Fig. 4 is a view of the same parts when the back and top are folded down, as shown in Fig. 2. Fig. 5 is a view of the hinged part of the top or roof, representing the same as folded or hanging down. Fig. 6 is a vertical sectional view of the back panel, and Fig. 7 is a similar view of one of the panels of the vehicle.

The improved Hansom cab, when fitted up as shown in Fig. 1, is very similar in appearance to an ordinary hansom; but the top or roof, sides, and back panels are so jointed and fitted that the whole upper part of the vehicle can be folded down, as shown in Fig. 2, to form an open phaeton; or the open carriage may be again transformed into a close hansom with very little trouble.

For the purpose of the transformation referred to, the vehicle is constructed with wooden panels or with glass-supporting frames $a$; or these frames may be glass-frames with venetians attached thereto. The frames $a$ are fitted in a manner similar to the window-frames of ordinary carriages, to be capable of sliding down into recesses or runs $a'$, formed for them in the lower part of the framing or sides A of the vehicle, as seen particularly in Fig. 7, or to be kept up and closed in the same manner as the glass-frames in ordinary carriage-doors. The back panel, $b$, of the hansom is fitted in a similar manner to slide vertically, or nearly so, into a recess, $b'$, below in the lower back part, B, of the carriage when it is desired to use it as an open vehicle, and when the side panels or glass-frames, $a$, and back panel, $b$, are so lowered the roof or top C may still be left up to form a sunshade, if desired. When an entire change to an open vehicle is desired, the roof C C' and its supporting frames or posts $C^2 C^3$ are also lowered. For this purpose the roof is divided transversely near the center, and the two parts C C' are hinged at $c$, so that the rear portion, C', may be folded or doubled inward to bear against the lower side of the front part, C. The rear posts or side frames, $C^3$, on which the back part, C', of the roof rests, are also hinged at $d$ in about a line with the bottom of the glass-frames or panels $a$, and are folded down transversely at right angles to almost meet in the longitudinal center of the vehicle, as shown best in Fig. 4. The front posts or frames, $C^2$, are also made to fold back, but are preferably fitted with a strong rod or bracket, $c^2$, fixed to the frames $C^2$, and centered on pins or studs $c^3$, fitted in the lower framing, A, a short way back from the posts $C^2$, being thus fitted so that the roof C and front posts, $C^2$, which are rigidly connected together, will not fall back when the rear posts, $C^3$, are lowered. After the rear part, C', of the roof is folded inward on its hinges, as indicated in Fig. 5, the front posts, $C^2$, and roof C are pulled back by the driver swinging on the pins or stud $c^3$ as centers, and lowered until the upright posts $C^2$ lie horizontally on the lower framing or sides of the vehicle and the folded roof lies vertically behind, as shown in Fig. 2. The driver's footboard D, which is also hinged at the rear, is previously lifted and placed, as shown in dotted lines, to allow the projecting part of the roof to lie vertically at the back of the vehicle in a recess below the foot-board, or in the space usually occupied by the foot-board. A light railing, C⁴, is fitted on the top of the rear portion of the roof, and when the roof is folded down this rail glides over guiding-brackets $f$, fixed on the sides of the carriage, and rests against these brackets or the rear part of the framing A, to prevent any jar or vibration of the parts of the roof at the hinge. The driver's seat E may also be made capable of adjustment vertically by fitting it to rest on side steps, somewhat like a shelf, at different heights to place the driver in the most advantageous position in the different circumstances of the vehicle being covered or open.

The vehicle is otherwise constructed and fitted as an ordinary Hansom cab, as will be readily understood from the drawings.

Having thus described my invention, what I claim as new, and desire to secure by Letters Patent, is—

1. The arrangement or combination of the parts of a Hansom cab or vehicle, so constructed that the panels or glass-frames may be lowered and the upper frame-work and roof folded down to form an open carriage, substantially as described.

2. In a vehicle, the combination, with sides A A and back B, formed with the grooves or runs $a'$ and $b'$, respectively, of the panels $a$ $b$, posts C², having brackets $c^2$, studded to the sides A A by pins $c^3$, roof C C', hinged at $c$, and posts C³, substantially as described.

WILLIAM JOHNSTONE. [L. S.]

Witnesses:
 ARCHIBALD TAYLOR,
  Of No. 10 *Earl Grey Street, Edinburgh*.
 HENRY BELL CANDLISH,
  Of No. 52 *Hanover Street, Edinburgh*.